April 9, 1940.    J. G. McNALLY    2,196,775
SUBBING PHOTOGRAPHIC FILM
Filed June 10, 1938

JAMES G. McNALLY
INVENTOR
BY
ATTORNEYS

Patented Apr. 9, 1940

2,196,775

UNITED STATES PATENT OFFICE 2,196,775

SUBBING PHOTOGRAPHIC FILM

James G. McNally, Rochester, N. Y., assignor to Eastman Kodak Company, Rochester, N. Y., a corporation of New Jersey Application June 10, 1938, Serial No. 212,985

10 Claims. (Cl. 95—9)

This invention relates to subbing photographic film and particularly to subbing cellulose organic ester film base with certain synthetic resins.

The use of synthetic resins for subbing photographic film base has been described in previous patents. Nadeau U. S. Patent No. 2,133,110, granted October 11, 1938, discloses the use of synthetic resins such as the polyvinyl resins santolites, glyptals, alkyd resins and others as subs in combination with other subbing layers. These resins form satisfactory subs for cellulose organic ester film bases and serve to increase flexibility of the film without causing brittleness.

I have found that cellulose organic ester film base may also be subbed with alkyl esters of polyacrylic or polycrotonic acid and that film subbed with these resins is flexible and free from brittleness. Film subbed with the unesterified polymerized acids is brittle and that subbed with the acid salts of the polymerized compounds has a tendency to strip, that is, the various layers of the film do not satisfactorily adhere to the film base. Films produced in this way have a higher flexibility and resistance to fracture when folded than other types of subbed film and this improvement is particularly noticeable when the film is subjected to conditions of low relative humidity.

Figure 1:
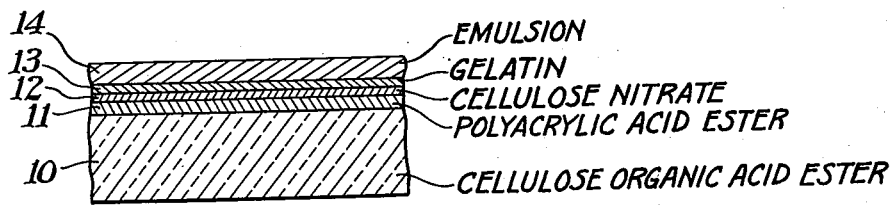
Figure 2:
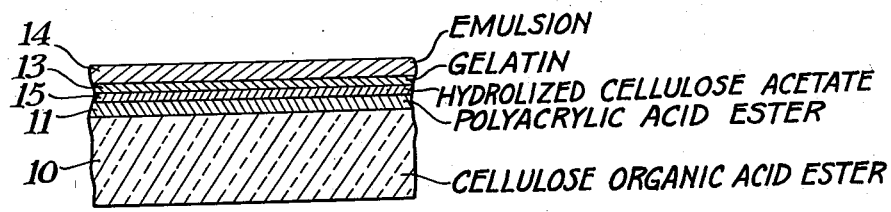
Figure 3:
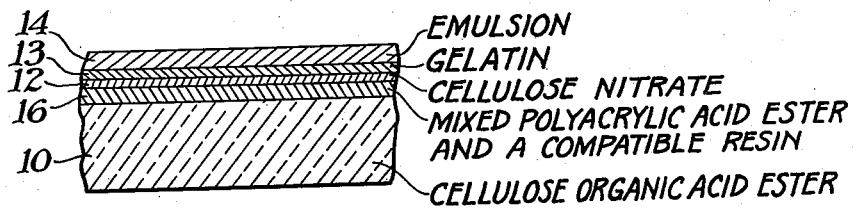

In the accompanying drawing, which shows enlarged sectional views of photographic film made according to my invention:

Fig. 1 is a sectional view of film subbed with successive layers of polyacrylic acid ester and cellulose nitrate, Fig. 2 is a sectional view of film subbed with successive layers of polyacrylic acid ester and hydrolyzed cellulose acetate and Fig. 3 is a sectional view of a film subbed with successive layers of a mixture of polyacrylic acid ester and another resin compatible therewith and cellulose nitrate.

It is well known that although the older types of film made of cellulose nitrate can be coated directly with gelatin and sensitive emulsion layers, the safety film bases cannot be made in this way. Gelatin does not adhere satisfactorily to a cellulose organic ester film base and it is, therefore, necessary to coat the base with intermediate layers which adhere both to the film base and to the successive gelatin layers coated thereon. This necessity for a succession of layers in coating cellulose organic ester film bases creates a number of problems. If subbing layers are used which adhere too greatly to the film base, the resulting film is likely to be brittle, and to rupture when the film is sharply bent. On the other hand, if the adhesion is not great enough the various layers strip or peel from the base when the film is subjected to photographic processing solutions or when it is in later use after drying.

According to my invention, a photographic film may be produced which has satisfactory stripping and brittleness properties and which maintains these conditions when the film is in equilibrium with low relative humidities, a condition which is likely to arise when the film is stored after processing. This film is made by coating a support of a cellulose organic ester such as cellulose acetate or cellulose acetate propionate with successive layers of an alkyl ester of polyacrylic or polycrotonic acid, cellulose nitrate or hydrolyzed cellulose acetate, gelatin and sensitive emulsion.

The preparation of polymerized ester of acrylic acid and its homologues has been described in the literature. These polymers are easily obtained by heating esters of acrylic acid such as the methyl, ethyl, or butyl esters. The compounds obtained in this manner are lightly colored masses of tough soft rubber material which resembles freshly milled crepe rubber. These polymerized acrylic acid esters are readily soluble in a number of organic liquids including acetone, methyl alcohol, ethyl alcohol, butyl alcohol, diacetone alcohol, methylene chloride, ethylene chloride, 1,4-dioxane, ethyl acetate, and others as well as mixtures of these liquids. The resins obtained by polymerizing the alkyl esters of acrylic acid and its homologues usually contain small percentages of carboxyl groups, depending on the conditions of polymerization. I have previously stated that the unesterified polymeric acids are not satisfactory as subbing materials since the film produced is too brittle for successful use. I have found that stripping of the layers of the film becomes worse as the number of carboxyl groups in the resin is increased but that brittleness on the other hand improves up to about 20% carboxyl content of the resin and then rapidly becomes very much worse. It is possible, therefore, to use polymerized esters of polyacrylic acid and its homologues containing up to about 20% carboxyl content. The method of subbing film according to my invention will now be illustrated by several examples, it being understood that these are illustrative only.

*Example 1*

A cellulose acetate photographic film base made from cellulose acetate containing about 40.5% acetyl was coated with a solution having the following composition:

| | Grams |
|---|---|
| Polymerized methyl acrylate | 1 |
| Acetone | 10 |
| Methyl alcohol | 5 |

After this coating had dried the following solution was applied:

| | Grams |
|---|---|
| Cellulose nitrate | 1 |
| Methyl alcohol | 40 |
| Butyl alcohol | 10 |

This layer was dried and a gelatin sub was then applied having the following composition:

| Gelatin | g | 1 |
|---|---|---|
| Acetic acid | g | 1 |
| Water | cc | 25 |
| Ethyl alcohol | cc | 25 |

The gelatin layer was dried and a photographic gelatino silver halide emulsion was then applied in the usual manner.

*Example 2*

A photographic film base of cellulose acetate propionate having a polyvinyl content of 6% and an acetyl content of 30% was coated with the following subbing solution:

| | Grams |
|---|---|
| Polymerized butyl acrylate | 10 |
| Cellulose nitrate | 3 |
| Acetone | 200 |
| Butyl acetate | 50 |

After drying, this sub was overcoated with the cellulose nitrate, gelatin and emulsion layers as described in Example 1.

*Example 3*

A photographic film base of hydrolyzed cellulose acetate propionate having a propionyl content of about 16% and an acetyl content of about 29% was coated with the following subbing solution:

| | Grams |
|---|---|
| Polymerized methyl acrylate | 1 |
| Acetone | 20 |
| Butyl acetate | 25 |

After drying, the sub layer was coated with a solution of hydrolyzed cellulose acetate containing 34% acetyl and having the following composition:

| | Grams |
|---|---|
| Cellulose acetate | 2 |
| Methyl alcohol | 50 |
| Acetone | 40 |
| Methyl ether of ethylene glycol | 8 |

After drying, this layer was coated with the gelatin and emulsion layers as described in Example 1.

*Example 4*

A cellulose acetate film base having the same composition as that of Example 1 was coated with a resin solution containing both polymerized methyl acrylate and polymerized vinyl acetate, (Gelva) having the following composition:

| | Grams |
|---|---|
| Polymerized methyl acrylate | 3 |
| Polymerized polyvinyl acetate | 3 |
| Acetone | 70 |
| Methyl alcohol | 8 |
| Ethyl acetate | 16 |

After drying this sub, it was coated with successive layers of cellulose nitrate gelatin and emulsion as described in Example 1.

My invention will now be described with particular reference to the accompanying drawing. As shown in Fig. 1, 10 is a film base of a cellulose organic acid ester coated with layers 11 of polyacrylic acid ester 12 of cellulose nitrate and 13 of gelatin. The sensitive emulsion layer 14 is coated on the gelatin layer 13.

As shown in Fig. 2, the support 10 of cellulose organic acid ester is coated with the layer 11 of polyacrylic acid ester and on this is coated layer 15 of hydrolyzed cellulose acetate. The gelatin layer 13 and emulsion layer 14 are coated in succession on the layer 15.

Fig. 3 illustrates a modification of my invention in which a sub of a mixture of polyacrylic acid ester and a compatible resin is used. As shown therein, the support 10 of a cellulose organic acid ester is coated with the sub layer 16 which contains both a polyacrylic acid ester and a compatible resin such as Gelva. The layer 12 of cellulose nitrate and gelatin layer 13 and emulsion layer 14 are coated in succession on the sub layer 16.

Various modifications in the composition of the various layers of the film made according to my invention may be used and some of these modifications will now be described.

The film base or support may be composed of any organic acid ester of cellulose such as cellulose acetate, cellulose propionate, cellulose acetate propionate, cellulose acetate butyrate, either fully esterified or hydrolyzed. I prefer to use cellulose acetate or other simple organic acid esters of cellulose although the mixed acid esters are quite satisfactory. Film base of cellulose nitrate may also be used although with cellulose nitrate it is not usually necessary to resort to the subbing technique described herein as it is relatively more simple to obtain satisfactory coatings on cellulose nitrate film support. It is also possible to use film supports of cellulose ethers or of various synthetic resins such as polymerized vinyl acetate.

The resin subs used may be composed of esters of polyacrylic or polycrotonic acid such as the methyl, ethyl, propionyl or butyl esters. These resins may be used alone or mixed with other compatible resins or with cellulose nitrate or plasticizer. Additions of cellulose nitrate in amounts of $\frac{1}{10}$ to $\frac{1}{2}$ of the amount of resin do not adversely affect stripping and brittleness and in some cases are found to be beneficial. The addition of other compatible resins or plasticizers is not harmful and has been found in some cases to increase the adhesion of the sub to the supports. Polymerized vinyl acetate sold under the trade name Gelva is suitable for addition to the polymerized methyl acrylate. As plasticizers, compounds such as ethyl phthalate, butyl phthalate, dimethylphthalate, triethylene glycol, diethylene glycol dibutyrate, diethylene glycol dibenzoate, triphenylphosphate, methyl phthalate, methyl glycolate, butoxy dibutyl succinate, triacetin, tributyrin, or diacetone alcohol may be used in amounts up to 20% of the weight of the resin.

The thickness of the resin sub layer must be controlled to produce the desired flexibility and brittleness characteristics. The resin coating may vary between a thickness of .000045 inch to a thickness of .0002 inch. A coating of this thickness is obtained by applying the resin from about a 4% solution in acetone or acetone and alcohol.

The thickness of a coating obtained by applying a 6% solution of the resin appears to be about the maximum usable coating as thicker coatings tend very slightly to show stripping. Thinner coatings such as those made from a ½% solution of the resin are so tenuous that presumably the cellulose nitrate coated over them strikes through to the film base and produces a film with good stripping properties but too brittle.

Various solvents may be used for the resin subbing solutions and these solvents may be chosen according to their action on the film support used. For example, with a cellulose acetate film base, ethyl acetate is a less active solvent than a mixture of methyl alcohol and ethylene dichloride. With cellulose acetate propionate film base, ethyl acetate and 1,4-dioxane showed a slight tendency to stripping during development but satisfactory coatings could be produced. The following solvent solutions are suitable:

Acetone.
1,4-dioxane.
Ethyl chlorhydrin.
Ethyl acetate.
Methyl alcohol_____45%   Acetone_____55%
Methyl alcohol_____10%   Methylene dichloride__90%
Methyl alcohol_____10%   Ethylene dichloride___90%

Other suitable solvents may also be used.

The cellulose nitrate or cellulose organic acid esters layer between the resin subbing layer and the gell layer is important and coatings in which this layer was omitted invariably meet with failure due to stripping. The gelatin emulsion will not gently adhere to the stripping nor was any combination of solvents for the resin sub found which would result in good adhesion when the nitrate or acetate coating was omitted. The coating which I prefer to use is a cellulose nitrate of high alcohol solubility and low viscosity. A suitable nitrate is one which has an alcohol solubility of 30% to 100% and a viscosity of 2 to 5 seconds by the dropping ball method. Viscosity by the dropping ball method is determined as follows:

10 grams of dry nitro cellulose is dissolved in 100 ccs. of a mixture comprising 50% by volume of methyl alcohol and 50% by volume of acetone at 25° C. Viscosity is measured by the time in seconds it takes for a steel ball having a diameter of ⅛ of an inch and weighing .1320 to .1340 gram to fall 15 centimeters through the nitro cellulose solution at 25° C. in a tube having a diameter of 1.7±.05 centimeters.

The gelatin sub coated between the cellulose nitrate or acetate layer and the sensitive emulsion layer can be coated from a solution of varying concentration. It was found that the gelatin solution indicated in the above examples could be diluted with methyl alcohol until the gelatin concentration was 0.3% without changing its subbing properties.

In testing the film for stripping and brittleness or flexibility properties, the various tests outlined in Nadeau Patent No. 2,133,110 may be used. A film which passes the tests described therein may be considered satisfactory from the standpoint of stripping and brittleness.

Numerous modifications of my invention not specifically described herein may be made and it is to be understood that my invention is to be limited only by the scope of the appended claims.

What I claim is:

1. A photographic film of satisfactory flexibility and free from brittleness, comprising a cellulose organic derivative support and a sensitive photographic gelatin layer adhesively joined to the support by a composite intervening layer comprising a thin sub of an alkyl ester of polyacrylic acid adhesively joined to the support, a cellulose derivative sub adhesively joined to the resin sub, and a gelatin sub adhesively joined to the cellulose derivative sub and to the sensitive gelatin layer, said composite intervening layer rendering the film flexible and free from brittleness under condition of low relative humidity.

2. A photographic film of satisfactory flexibility and free from brittleness, comprising a cellulose organic derivative support and a sensitive photographic gelatin layer adhesively joined to the support by a composite intervening layer comprising a thin sub of a methyl ester of polyacrylic acid adhesively joined to the support, a cellulose nitrate sub adhesively joined to the resin sub, and a gelatin sub adhesively joined to the cellulose derivative sub and to the sensitive gelatin layer, said composite intervening layer rendering the film flexible and free from brittleness under conditions of low relative humidity.

3. A photographic film of satisfactory flexibility and free from brittleness, comprising a cellulose organic derivative support and a sensitive photographic gelatin layer adhesively joined to the support by a composite intervening layer comprising a thin sub of a butyl ester of polyacrylic acid adhesively joined to the support, a cellulose nitrate sub adhesively joined to the resin sub, and a gelatin sub adhesively joined to the cellulose derivative sub and to the sensitive gelatin layer, said composite intervening layer rendering the film flexible and free from brittleness under conditions of low relative humidity.

4. A photographic film of satisfactory flexibility and free from brittleness, comprising a cellulose acetate support and a sensitive photographic gelatin layer adhesively joined to the support by a composite intervening layer comprising a thin sub of an alkyl ester of polyacrylic acid adhesively joined to the support, a cellulose nitrate sub adhesively joined to the resin sub, and a gelatin sub adhesively joined to the cellulose derivative sub and to the sensitive gelatin layer, said composite intervening layer rendering the film flexible and free from brittleness under conditions of low relative humidity.

5. A photographic film of satisfactory flexibility and free from brittleness, comprising a cellulose acetate support and a sensitive photographic gelatin layer adhesively joined to the support by a composite intervening layer comprising a thin sub of a methyl ester of polyacrylic acid adhesively joined to the support, a cellulose nitrate sub adhesively joined to the resin sub, and a gelatin sub adhesively joined to the cellulose derivative sub and to the sensitive gelatin layer, said composite intervening layer rendering the film flexible and free from brittleness under conditions of low relative humidity.

6. A photographic film of satisfactory flexibility and free from brittleness, comprising a cellulose acetate support and a sensitive photographic gelatin layer adhesively joined to the support by a composite intervening layer comprising a thin sub of a butyl ester of polyacrylic acid adhesively joined to the support, a cellulose nitrate sub adhesively joined to the resin sub, and a gelatin sub adhesively joined to the cellulose derivative sub and to the sensitive gelatin layer, said composite intervening layer rendering the film flexible and free from brittleness under conditions of low relative humidity.

7. A photographic film of satisfactory flexibility and free from brittleness, comprising a cellulose organic derivative support and a sensitive photographic gelatin layer adhesively joined to the support by a composite intervening layer comprising a thin sub of an alkyl ester of polyacrylic acid and a compatible cellulose ester adhesively joined to the support, a cellulose nitrate sub adhesively joined to the resin and cellulose ester sub, and a gelatin sub adhesively joined to the cellulose nitrate sub and to the sensitive gelatin layer, said composite intervening layer rendering the film flexible and free from brittleness under conditions of low relative humidity.

8. A photographic film of satisfactory flexibility and free from brittleness, comprising a cellulose organic derivative support and a sensitive photographic gelatin layer adhesively joined to the support by a composite intervening layer comprising a thin sub of an alkyl ester of polyacrylic acid and from 10% to 50% of cellulose nitrate, adhesively joined to the support, a cellulose nitrate sub adhesively joined to the resin and cellulose nitrate sub, and a gelatin sub adhesively joined to the cellulose nitrate sub and to the sensitive gelatin layer, said composite intervening layer rendering the film flexible and free from brittleness under conditions of low relative humidity.

9. A photographic film of satisfactory flexibility and free from brittleness, comprising a cellulose organic derivative support and a sensitive photographic gelatin layer adhesively joined to the support by a composite intervening layer comprising a thin sub of an alkyl ester of polyacrylic acid and an organic plasticizer, adhesively joined to the support, a cellulose nitrate sub adhesively joined to the resin and plasticizer sub, and a gelatin sub adhesively joined to the cellulose nitrate sub and to the sensitive gelatin layer, said composite intervening layer rendering the film flexible and free from brittleness under conditions of low relative humidity.

10. A photographic film of satisfactory flexibility and free from brittleness, comprising a cellulose organic derivative support and a sensitive photographic gelatin layer adhesively joined to the support by a composite intervening layer comprising a thin sub of an alkyl ester of polyacrylic acid and from 0 to 20% of an organic plasticizer, adhesively joined to the support, a cellulose nitrate sub adhesively joined to the resin and plasticizer sub, and a gelatin sub adhesively joined to the cellulose nitrate sub and to the sensitive gelatin layer, said composite intervening layer rendering the film flexible and free from brittleness under conditions of low relative humidity.

JAMES G. McNALLY.